(12) United States Patent
Zhang

(10) Patent No.: US 11,784,354 B2
(45) Date of Patent: Oct. 10, 2023

(54) METHOD OF MANUFACTURING A SOLID STATE BATTERY AND SOLID STATE BATTERY

(71) Applicant: VOLKSWAGEN AKTIENGESELLCHAFT, Wolfsburg (DE)

(72) Inventor: Wenbo Zhang, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 203 days.

(21) Appl. No.: 17/174,856

(22) Filed: Feb. 12, 2021

(65) Prior Publication Data
US 2021/0257670 A1    Aug. 19, 2021

(30) Foreign Application Priority Data
Feb. 14, 2020    (DE) .................... 10 2020 103 989.1

(51) Int. Cl.
*H01M 10/0585* (2010.01)
(52) U.S. Cl.
CPC ............................ *H01M 10/0585* (2013.01)
(58) Field of Classification Search
None
See application file for complete search history.

(56) References Cited

U.S. PATENT DOCUMENTS

| 2015/0171478 A1 | 6/2015 | Suzuki et al. |
| 2016/0013463 A1 | 1/2016 | Roumi et al. |
| 2019/0382317 A1 | 12/2019 | Gomez et al. |

FOREIGN PATENT DOCUMENTS

DE    10 2016 221 472 A1    5/2018

OTHER PUBLICATIONS

Search report for German Patent Application No. 10 2020 103 989.1, dated Oct. 8, 2020.

*Primary Examiner* — Sarah A. Slifka
(74) *Attorney, Agent, or Firm* — PEARL COHEN ZEDEK LATZER BARATZ LLP

(57) ABSTRACT

A method for producing a solid state battery, comprising: providing a first solid state electrolyte membrane layer; applying an electronically conductive matrix to the cathode side of the first solid state electrolyte membrane layer; building up a cathode layer on the cathode side of the first solid state electrolyte membrane layer and applying an anode layer to an anode side of the first solid state electrolyte membrane layer, wherein the cathode layer has a higher elasticity than the first solid state electrolyte membrane layer, and the modulus of elasticity of the cathode layer is lower than the modulus of elasticity of the first solid state electrolyte membrane layer. A solid state battery may be produced using the method according to the invention.

9 Claims, 2 Drawing Sheets

METHOD OF MANUFACTURING A SOLID STATE BATTERY AND SOLID STATE BATTERY

CROSS REFERENCE TO RELATED APPLICATION

This application claims priority from German Patent Application No. 10 2020 103 989.1, filed Feb. 14, 2020, which is incorporated herein by reference in its entirety.

BACKGROUND OF THE INVENTION

The invention relates to a method of manufacturing a solid state battery and to a solid state battery. In the method, a cathode layer is built up on one side of a provided first solid state electrolyte membrane layer and an anode layer is built up on the other side of said membrane layer. Such a solid state battery (SSB) thus comprises a solid state electrolyte membrane layer, on one side of which a cathode layer is built up and on the other side of which an anode layer is built up.

Currently, lithium-ion accumulators or lithium-ion batteries that work with liquid electrolytes are predominantly used in vehicles. These substances are flammable and sometimes necessary cooling devices and other devices are required in order to extend the service life of such lithium-ion accumulators. It is also important that such accumulators are never fully charged or discharged, as this can considerably reduce their service life.

Therefore, concepts are increasingly being developed and tested that work with solid state batteries or solid state accumulators, and which are also based on lithium-ion technology, but in which the liquid electrolyte is replaced by a layer of a solid state electrolyte that is non-flammable.

There are different approaches to replacing the liquid electrolyte, for example by organic polymer electrolytes or inorganic solid state electrolytes. The lithium-ion conductive electrolyte is therefore in the form of a solid body or a solid membrane, which are considerably less risky than the common liquid alternatives. Polymer electrolytes and solid state electrolytes are known from the literature or documents such as DE 10 2016 221 472 A1.

Solid state electrolytes are formed from oxides, e.g. $Li_7La_3Zr_2O_{12}$ (LLZ), $Li_{2+2x}Zn_{1-x}GeO_4$ or $Li_{1+x}Al_xTi_{2-x}(PO)_4$, which act as ion conductors and serve for charge transport between the cathode and anode. Such substances have a high ionic conductivity and good chemical stability in air. However, oxide-based solid state electrolytes usually have a very high modulus of elasticity (e.g. >150 GPa). In the battery there is therefore a low power density with a high energy density, which is due to the fact that high currents are transmitted via the solid-solid interfaces. Therefore, in some circumstances, there are high contact resistances between the oxide solid state electrolyte and a cathode material which is formed from a lithium metal oxide.

When solid state electrolytes are used with a lower modulus of elasticity (e.g., <20 GPa)—for example sulfide solid state electrolytes such as $Li_3PS_4$ (glass ceramic), $Li_6PS_5X$ (X=Cl, Br, I) or $Li_{12}GeP_2S_{12}$ (LGPS) this contact resistance can be effectively reduced. However, there is a risk of oxidation at the interfaces where, for example, conductive carbon black or acetylene black is applied. The oxidation of such sulfide solid state electrolytes reduces the ionic conductivity thereof. This causes a high internal cell resistance. Furthermore, the conductive additives can be distributed randomly in the composite cathode and thus can further impair the conductivity. This is because the agglomeration may cause further contact losses between the individual layers. This agglomeration is caused and intensified by going through the charging cycles.

The previous solid state battery concepts with solid state electrolytes, therefore, have a number of disadvantages:

In solid state batteries in which the active material and a solid state electrolyte with a high modulus of elasticity are sintered together, the risk of reaction between the materials at high temperatures cannot be eliminated and the use of conductive carbon black and carbon is not possible because of the high sintering temperatures. The cell performance has therefore remained unsatisfactory so far.

So-called gel electrolytes only offer reasonable lithium-ion conductivities at comparatively high temperatures (>60° C.). Even additives that are used during sintering in order to reduce the reactions between the materials at high temperatures have only a limited effect, since sintering temperatures of 700° C. have so far only allowed cells with a relatively low capacity.

SUMMARY OF THE INVENTION

The object of the present invention is therefore to provide a method of manufacturing a solid state battery or a solid state battery in which the above-mentioned disadvantages can be at least partially overcome.

A particular object is to provide a lithium ion solid state battery with improved properties.

Another object can be seen in providing a lithium ion solid state battery with an oxide solid state electrolyte. Current approaches pursue a concept for lithium air solid state batteries or lithium air solid state accumulators, in which there is an anode made of lithium and an electrolyte which has either a ceramic, glass or glass-ceramic composite material. Cathodes are usually made of porous carbon and polymer-ceramic composite materials, which improve the charge transfer to the anode and connect the cathode electrochemically to the electrolyte, are arranged between the anodes and cathodes. The polymer-ceramic composite materials serve to reduce the resistance.

This object is achieved by the method according to the invention and the solid state battery according to the invention. Further advantageous embodiments of the invention are disclosed by the dependent claims and the following description of preferred exemplary embodiments of the present invention.

The method according to the invention for manufacturing a solid state battery 100 is characterized by the following steps:
  providing a first solid state electrolyte membrane layer 1
  applying an electronically conductive matrix 3 to the cathode side of the first solid state electrolyte membrane layer 1
  applying a cathode layer 4 to the electronically conductive matrix 3 on the cathode side of the first solid state electrolyte membrane layer 1
  applying an anode layer 5 to the anode side of the first solid state electrolyte membrane layer 1, wherein the cathode layer 10 has greater elasticity than the first solid state electrolyte membrane layer 1 and the modulus of elasticity of the cathode layer 10 is lower than the modulus of elasticity of the first solid state electrolyte membrane layer 1.

A solid state battery 100 produced according to this method has the following structure:
  a first solid state electrolyte membrane layer 1 an electronically conductive matrix 3 on the cathode side of the first solid state electrolyte membrane layer 1 a cathode layer 4 on the electronically conductive matrix 3 on the cathode side of the first solid state electrolyte membrane layer 1 an anode layer 5 on the anode side of the first solid state electrolyte membrane layer 1, wherein the cathode layer 4 has a greater elasticity than the first solid state electrolyte membrane layer 1 and the modulus of elasticity of the cathode layer 4 is lower than the modulus of elasticity of the first solid state electrolyte membrane layer 1.

With this concept it is possible to use a dense solid state electrolyte layer, which serves as the membrane and electrolyte of the solid state battery. The thickness of this layer is between 20 and 100 μm. An electronically conductive matrix 3 on the cathode side of this first solid state electrolyte membrane layer 1 makes it possible to establish a conductive connection to the subsequently built-up cathode layer 4. The method and the solid state battery 100 are characterized in that the cathode layer 4 has a higher elasticity than the first solid state electrolyte membrane layer 1 and that the modulus of elasticity of this cathode layer 4 is lower than the modulus of elasticity of the first solid state electrolyte membrane layer 1. As a result, the contact between the solid state electrolyte membrane layer 1 with a high modulus of elasticity and the cathode layer 4 with a lower modulus of elasticity is significantly improved and the contact resistance between the two layers is significantly reduced.

There are methods in which the second solid state electrolyte membrane layer 2 has a higher elasticity than the first solid state electrolyte membrane layer 1. This means that the modulus of elasticity of the second solid state electrolyte membrane layer 2 is lower than the modulus of elasticity of the first solid state electrolyte membrane layer 1. This significantly increases the effect of improving contact. There is a better connection between the second solid state electrolyte membrane layer 2 (lower modulus of elasticity) and the first solid state electrolyte membrane layer 1 (greater modulus of elasticity) and the cathode layer 4 and cathode layer 10 or the anode layer 5 can be connected better to the somewhat more elastic second solid state electrolyte membrane layer 2 than directly to the first solid state electrolyte membrane layer 1. This further reduces the contact losses at the interfaces.

There are methods in which the cathode layer 4 is built up in multiple layers in several cycles of a spray coating drying method using a solution which comprises the solid state electrolyte material, the active material and a protective material. In particular, the same solid state electrolyte material is used as for the second solid state electrolyte membrane layer 2.

The active material particles are coated with a protective layer, for example with $LiNiO_3$. This solution is then sprayed onto the second solid state electrolyte membrane layer 2 or onto the cathode side of the first solid state electrolyte membrane layer 1. The preferred layer thickness is in the order of magnitude of the particle size of the particle materials, for example between 5 and 50 μm. After the drying step, further layers can be applied iteratively in the same way until the desired thickness of the composite cathode is achieved.

There are methods in which an electronically conductive matrix 3 is arranged between each pair of cathode layers 4 in order to improve the ion transport. In connection with the present invention, the term conductive matrix means that the conducting matrix material, for example conductive carbon black, is applied with an interrupted structure. The contact areas are thus reduced without reducing the ion transport. The decomposition of the solid state electrolyte can thus be significantly reduced.

There are methods in which the conductive matrix 3 is designed as a grid and this grid has a mesh size equal to the size of the active material particles. The mesh size can then be, for example, between 5 and 50 μm.

The main advantages of a solid state battery which is manufactured according to the method steps described above, and has the structure according to the invention, are that it has the following properties in particular: By the use of the second solid state electrolyte membrane layers 2 with a lower modulus of elasticity than the first solid state electrolyte membrane layer 1, a better connection of the surfaces is created, which leads to an improved conductivity between the layers.

BRIEF DESCRIPTION OF THE DRAWINGS

Embodiments of the invention will now be described by way of example and with reference to the accompanying drawings. In the drawings.

DETAILED DESCRIPTION OF THE INVENTION

Figure 1:
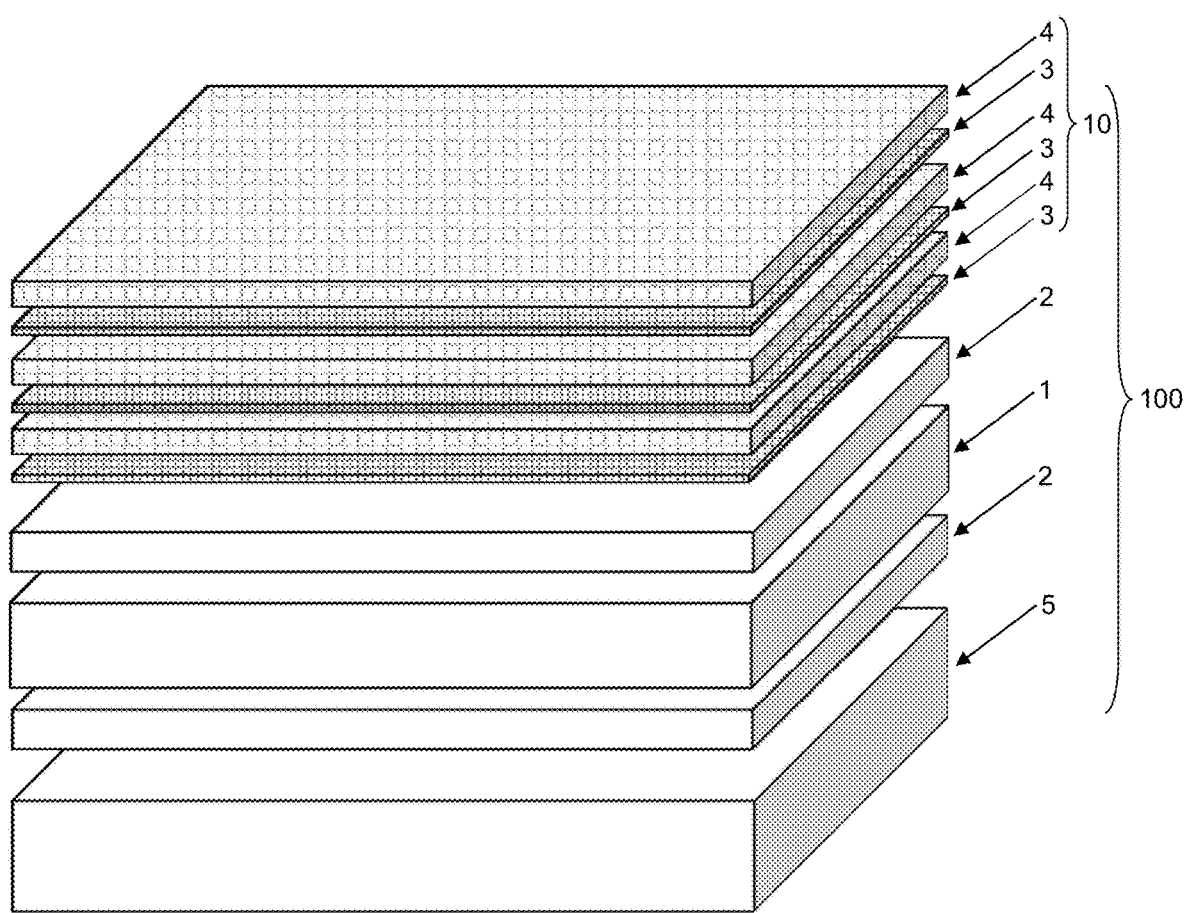
FIG. 1 shows the schematic structure of an embodiment of a solid state battery according to the invention.

FIG. 1 shows the schematic structure of an embodiment of a solid state battery according to the invention. In this case, first of all a first solid state electrolyte membrane layer 1 is provided. This solid state electrolyte membrane layer 1 can be formed and comprises a metal oxide material (for example $Li_7La_3Zr_2O_{12}$, $Li_{2+2x}Zn_{1-x}GeO_4$ or $Li_{1+x}Al_xTi_{2-x}(PO_4)_3$). The first solid state electrolyte membrane layer 1 is provided on the cathode side with an optional second solid state electrolyte membrane layer 2 which has a significantly lower modulus of elasticity than the first solid state electrolyte membrane layer 1. The moduli of elasticity of the first solid state electrolyte layer 1 are over 150 GPa. The moduli of elasticity of the second solid state electrolyte membrane layer 2 are in the range between 10 and 20 GPa. A typical material that serves to form the second solid state electrolyte membrane layer 2 is, for example, $LiI$—$Li_4SnS_4$. This second solid state electrolyte membrane layer 2 can be applied, for example, by known coating methods such as ALD (atomic layer deposition), PLD (pulsed laser deposition) or sputtering. A second solid state electrolyte membrane layer 2 can also be applied in the same way on the anode side.

On the second solid state electrolyte membrane layer 2 on the cathode side, a multilayer cathode layer 10 is provided which is constructed as follows:

Firstly, an electron-conducting conductive matrix 3, which is designed as a grid and is made of conductive carbon black or graphite with a large surface, is applied to the first and the second solid state electrolyte membrane layers 1, 2. This conductive matrix 3 can be applied, for example, by a printing process. The conductive carbon black is applied to the first and second solid state electrolyte membrane layers 1, 2 in the desired manner and forms the conductive matrix 3. This electron-conducting conductive matrix 3 has a grid-like structure in which one grid width remains below the particle size of the active materials of the cathode material. Possible matrix materials are those materials that enable good electron conductivity (e.g. metals or electrically conductive carbons). All deposition processes in which the conductive matrix material is reliably applied in a grid-like manner to the corresponding layer (e.g. printing, painting or other processes) can serve as application processes.

A cathode layer 4 is then formed on the conductive matrix 3. This layer contains, for example, particles of the cathode active material that are provided with a protective coating. $LiNbO_3$, for example, and also substances from which the second solid state electrolyte membrane layer 2 is built up, for example $LiI$—$Li_4SnS_4$, which is readily soluble in methanol, can serve as a protective coating. The solution is then applied to the conductive matrix 3 by a spray coating-drying process. The layer thickness should be set by the concentration of the solution and checking of the application time. The cathode layer 4 formed in this way should not be larger than the particle size of the active materials, that is to say, for example, 5 to 10 μm.

Drying temperatures should not exceed 300° C., so that the properties of the substances are not adversely affected during application and drying. Such a $LiI$—$Li_4SnS_4$ layer can be formed at 200° C., for example. In addition, pressure can be exerted on the applied cathode layer 10 during drying in order to improve the contacts at the interfaces and thus to improve the electrical properties of the solid state battery 100. The cathode layer 10 is made up of several iteratively applied layer pairs, conductive matrix 3 and cathode layer 4 until a cathode layer 10 is present in the desired thickness (the layer thickness is preferably 20 to 200 μm).

On the anode side, an anode layer 6 made of conventional materials such as $Li_4Ti_5O_{12}$, graphite, amorphous carbon or carbon/Sn and carbon/Si alloys is applied in conventional coating and manufacturing processes to the second solid state electrolyte membrane layer 2 or directly to the first solid state electrolyte membrane layer 1.

Figure 2:
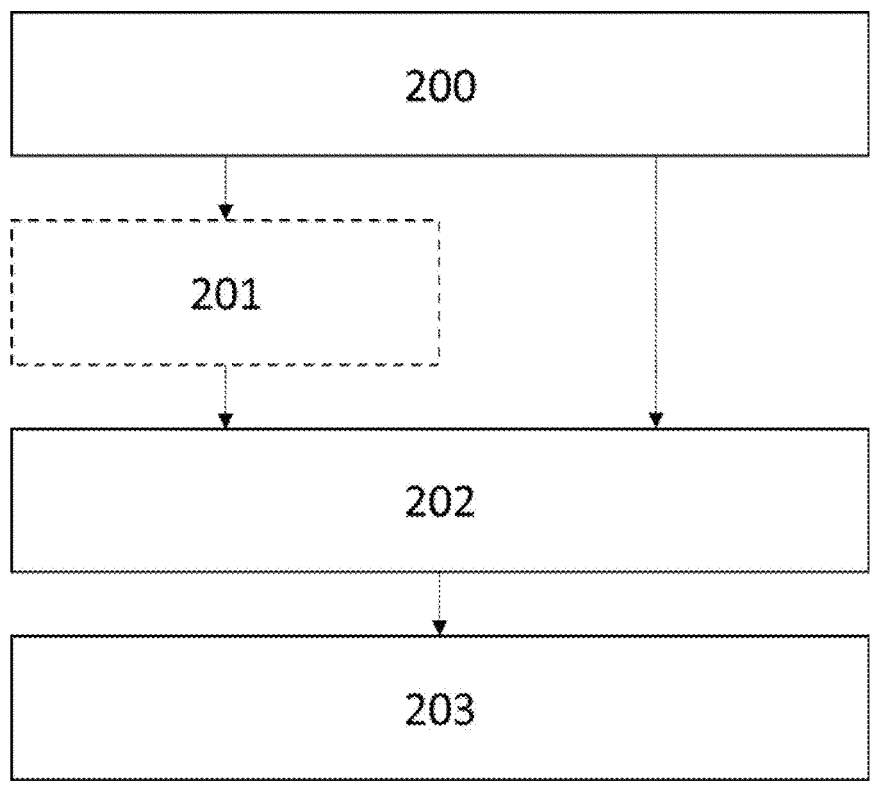
FIG. 2 is a schematic flow diagram of a method according to the invention for manufacturing a solid state battery according to the invention and FIG. 3 is a schematic flow diagram of a method according to the invention for manufacturing a solid state battery according to the invention with further optional steps.

The method shown in FIG. 2 shows the following steps:
200: providing a first solid state electrolyte membrane layer 1
201: applying a second solid state electrolyte membrane layer 2 to the cathode side and anode side of the first solid state electrolyte membrane layer 1
202: building up a cathode layer 10 on the cathode side of the first or second solid state electrolyte membrane layer 1, 2
203: applying an anode layer to the anode side of the first or second solid state electrolyte membrane layer 1, 2

Figure 3:
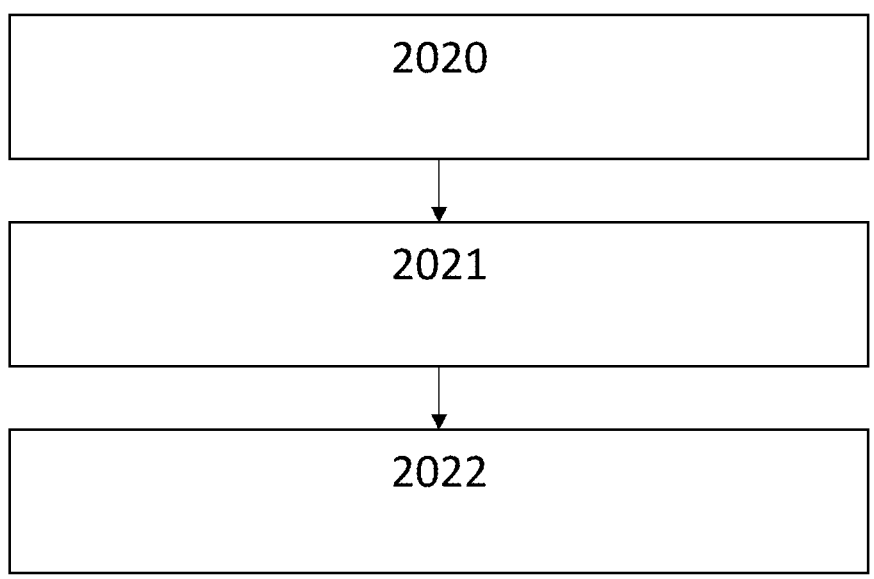

The method shown in FIG. 3 shows further optional steps:
2020: applying an electronically conductive matrix 3
2021: applying the cathode layer 4 by means of a solution which contains the solid state electrolyte material from the solid state electrolyte membrane layer 2, an active material particle and a protective material
2022: drying step Further variants and embodiments are disclosed to a person skilled in the art within the scope of the claims and the present disclosure.

LIST OF REFERENCE SIGNS

100 solid state battery
1 first solid state electrolyte membrane layer 1
2 second solid state electrolyte membrane layer 2
3 conductive matrix
4 cathode layer
5 anode layer
10 cathode layer

The invention claimed is:

1. A method of manufacturing a solid state battery, comprising:
   providing a first solid state electrolyte membrane layer;
   applying an electronically conductive matrix to the cathode side of the first solid state electrolyte membrane layer;
   building up a cathode layer on a cathode side of the first solid state electrolyte membrane layer; and
   applying an anode layer to an anode side of the first solid state electrolyte membrane layer,
   wherein the cathode layer has a greater elasticity than the first solid state electrolyte membrane layer, and a modulus of elasticity of the cathode layer is lower than a modulus of elasticity of the first solid state electrolyte membrane layer, and
   wherein the conductive matrix is designed as a grid, and the grid has a width of the size of the active material particles.

2. The method according to claim 1, further comprising applying a second solid state electrolyte membrane layer to the cathode side of the first solid state electrolyte membrane layer.

3. The method according to claim 2,
   wherein applying the anode layer comprises applying a third solid state electrolyte membrane layer to the first solid state electrolyte layer,
   wherein the second solid state electrolyte membrane layer is arranged between the first solid state electrolyte layer and the anode layer, and
   wherein the third solid state electrolyte membrane layer uses the same solid state electrolyte material as the second solid state electrolyte membrane layer.

4. The method according to claim 2, wherein the second solid state electrolyte membrane layer has a greater elasticity than the first solid state electrolyte membrane layer, and the modulus of elasticity of the second solid state electrolyte membrane layer is lower than the modulus of elasticity of the first solid state electrolyte membrane layer.

5. The method according to claim 1, wherein the cathode layer is built up in several layers in several cycles of a spray coating-drying method using a solution which comprises solid state electrolyte material and active material particles.

6. The method according to claim 5, wherein the layer thickness of each cathode layer corresponds to the size of the active material particles and is in a range between 5 and 10 μm.

7. The method according to claim 5, wherein an electronically conductive matrix is arranged between each pair of cathode layers.

8. The method according to claim 1, wherein the active material particles are provided with a protective layer, and the protective layer comprises a $LiNbO_3$ layer.

9. A solid state battery that is produced by a method according to claim 1, comprising:
   a first solid state electrolyte membrane layer;
   an electronically conductive matrix on a cathode side of the first solid state electrolyte membrane layer;
   a cathode layer on the cathode side of the first solid state electrolyte membrane layer;
   an anode layer on an anode side of the first solid state electrolyte membrane layer, wherein the cathode layer has a greater elasticity than the first solid state electrolyte membrane layer, and a modulus of elasticity of the cathode layer is lower than a modulus of elasticity of the first solid state electrolyte membrane layer, and wherein the conductive matrix is designed as a grid, and the grid has a width of the size of the active material particles.

* * * * *